United States Patent [19]
Kaplan et al.

[11] Patent Number: 5,701,460
[45] Date of Patent: Dec. 23, 1997

[54] INTELLIGENT JOINING SYSTEM FOR A RELATIONAL DATABASE

[75] Inventors: David L. Kaplan, Mercer Island; Andrew R. Miller, Bellevue, both of Wash.

[73] Assignee: Microsoft Corporation, Redmond, Wash.

[21] Appl. No.: 652,366

[22] Filed: May 23, 1996

[51] Int. Cl.$^6$ .................................................. G06F 17/30
[52] U.S. Cl. ........................................ 395/603; 395/604
[58] Field of Search ................................ 395/601, 602, 395/603–605, 708

[56] References Cited

U.S. PATENT DOCUMENTS

| | | | |
|---|---|---|---|
| 5,495,605 | 2/1996 | Cadot | 395/604 |
| 5,548,755 | 8/1996 | Leung et al. | 395/602 |
| 5,572,650 | 11/1996 | Antis et al. | 395/356 |
| 5,596,746 | 1/1997 | Sheo et al. | 395/612 |
| 5,600,831 | 2/1997 | Levy et al. | 395/602 |
| 5,630,120 | 5/1997 | Vachey | 395/602 |

*Primary Examiner*—Paul Kulik
*Attorney, Agent, or Firm*—Duft, Graziano & Forest

[57] ABSTRACT

A system for generating a structured query language query to extract data from a database wherein the database includes a schema defined by a plurality of record sources and a plurality of relationships therebetween. The system includes selecting a field set containing at least one field from among said plurality record sources in said database, and determining a minimal path relationship between each of the plurality of record sources in the database that contain at least one field from the field set. The minimal path relationship includes at least one indirect relationship between two of the plurality of record sources in the database that contain at least one field from the field set. Output from the intelligent joining system is a Structured Query Language (SQL) statement in the syntactical form that a database management system can execute. Additional output can include an edge set containing the minimal paths between record sources that contain at least one field from the field set, and a graph of the sub-schema defined by the field set. The output is generated from the above identified inputs in a manner transparent to the database user.

23 Claims, 12 Drawing Sheets

FIG. 1

Employees (100)

| Employee Number | Last Name | First Name | Dept. Number | Dept. Name | Manager |
|---|---|---|---|---|---|
| 001 | Miller | Andrew | 4173 | Access Development | Bob Gunderson |
| 002 | Kaplan | Dave | 4173 | Access Development | Bob Gunderson |
| 003 | Warden | Drew | 4173 | Access Development | Bob Gunderson |
| 004 | Hood | Destry | 4176 | Access Testing | Gail Kulikowsky |
| 005 | Eng | Michael | 4176 | Access Testing | Gail Kulikowsky |

FIG. 2

Employees (202)

| Employee Number | Last Name | First Name | Dept. Number |
|---|---|---|---|
| 001 | Miller | Andrew | 4173 |
| 002 | Kaplan | Dave | 4173 |
| 003 | Warden | Drew | 4173 |
| 004 | Hood | Destry | 4176 |
| 005 | Eng | Michael | 4176 |

Departments (203)

| Department Number | Department Name | Manager |
|---|---|---|
| 4173 | Access Development | Bob Gunderson |
| 4176 | Access Testing | Gail Kulikowsky |

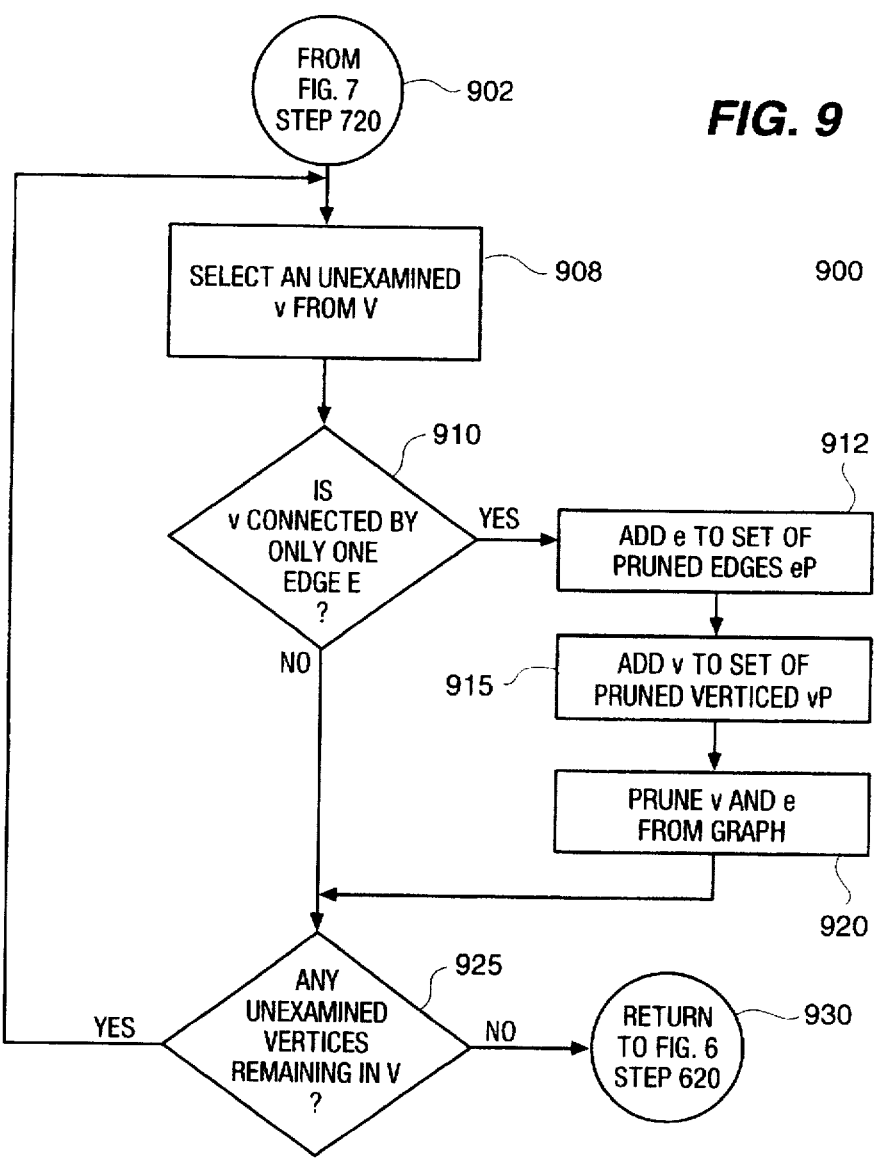

INTELLIGENT JOINING SYSTEM FOR A RELATIONAL DATABASE

FIELD OF THE INVENTION

This invention relates to the field of database management and in particular to a system for determining a minimal path relationship between record sources in a relational database, and generating a query based on the minimal path relationships needed to extract data from the relational database.

PROBLEM

A database is a collection of related data that is typically stored on a nonvolatile memory medium. Data in the database are commonly organized in a two-dimensional row and column form called a table. A database typically includes multiple tables. A table is an object in the database containing at least one record and at least one field within each record. A record is a row of data in the table that is identified by a unique numeric called a record number. A field is a subdivision of a record to the extent that a column of data in the table represents the same field for each record in the table. Each field in a record is identified by a unique field name and a field name remains the same for the same field in each record of the table. Therefore, a specific datum in a table is referenced by identifying a record number and a field name.

A database management system is a control system that supports database features including, but not limited to, storing data on a memory medium, and retrieving data from the memory medium. Data in the database is typically organized among a plurality of objects that include, but are not limited to, tables and queries. An individual one of the previously identified objects is referred to as a record source because it is a source of data or records from the database. A table is an object having two-dimensional record and field organization as previously discussed. A query, in terms of an object rather than an action, is an executable database interrogation statement, command, and/or instruction that communicates to the database management system the identity and location of data being extracted from the database. The product of an executed query is called a result set and it is the result set that is typically stored and/or manipulated as a two-dimensional object similar to the table discussed previously.

A relational database is a common database type managed by a database management system. One important characteristic of a relational database is that the data therein is distributed among multiple record sources that are typically related, or normalized, in a manner designed to minimize redundant data in the database, minimize the space required to store data in the database, and maximize data accessability. Generally speaking, a normalized database is one where each record source in the database is directly related to at least one other record source in the same database by key fields. A key field can be a primary key or a foreign key. A primary key is the one field or combination of fields in a record source that contains unique data for each record in the table. A foreign key is any non-primary key in a record source that is the basis for a direct relation with any other record source. Note that a database remains a relational database regardless of the degree of normalization that exists. Further, although record sources in a normalized relational database are typically related, a relational database may be normalized even if the database is disconnected in that at least one record source in the database is not related to any other record source by a key field.

A relationship, also referred to as a relation or join between any two record sources in a relational database, is either a direct relationship or an indirect relationship. A direct relationship exists between a first record source and a second record source if there is no intervening record source in the relationship path therebetween. An indirect relationship exists between a first record source and a second record source if there is at least one intervening record source in the relationship path therebetween. The record sources in a relational database and the relations therebetween collectively define the geography of a database called a database schema. A sub-schema of the database is any subset of the full database schema that is defined by a query, a result set of a query, or any other subset of record sources from the database. A database schema and database sub-schema are typically visually displayed or conceptually thought of in graphic form as a graph having edges or arrows representing relationships between record sources, and vertices, also known as nodes or tables, representing the record sources at either end of a relationship.

A relationship between two record sources in a relational database is said to have cardinality. Cardinality is a representation of the type of direct relation that exists between a primary key and a foreign key in two separate but related record sources. Cardinality can be 1-to-1, 1-to-many, or unknown. For example, in a company database, a 1-to-many relation may exist between a Supplier table having a SupplierID primary key and a Products table having a SupplierID foreign key. A 1-to-many relationship is the most common direct relationship. A many-to-many relationship is an indirect relationship between two record sources that are separated by at least two direct relationships along the relationship path therebetween.

A query is used to access data in a relational database. The query is typically constructed in a Structured Query Language (SQL) that may or may not be based on the American National Standards Institute (ANSI) standard SQL definition. To access data in existing relational databases, the database user must manually construct a query using the unforgiving syntax of an SQL. The typical SQL requires that each record source containing desired data be identified with specificity down to the relationship path, record source name, and field name, before the database management system can successfully execute the query. Executing the query is called a join or joining where it is each relation identified in the query that is being joined during execution to retrieve data from the database.

One problem is that even experienced database users have difficulty manually constructing an SQL query to properly extract the desired data from a relational database. One common error in constructing an SQL query is to improperly or incorrectly identify the relationships between record sources. The result of an improperly or incorrectly identified relationship is that the query might access the wrong data, or less than a complete set of data from what is available in the database, or more than a complete set of data than was desired, or some combination of the above.

Existing database management systems may allow a user to select fields from a list of field names that represent the data the user wishes to extract from the database. Based on the fields selected, existing database management systems attempt to construct and execute a query. However, the existing systems can only construct an SQL for simple queries where all fields identified in the query are located in one record source or all fields identified in the query are located in multiple record sources that are only separated by direct relationships. In other words, if any field in the query is located in a record source that can be joined only by identifying an indirect relation in the query, then existing database management systems will either give up or require that the user manually define the indirect relationship prior to constructing and executing the query. Requiring manual intervention to define indirect relationships means that the database schema is not transparent to the user which is more database knowledge than the average database user is often willing or able to accommodate.

Another problem with existing database management systems that attempt to construct and execute a query for the database user, is that the existing systems fail to identify the minimal length relationship path where more than one relationship path option is available. Failure to identify the minimal length relationship path results in a less efficient join which the database user perceives as a slow database or a database with a poor response time. Thus, not only does manual intervention by a user require that the user have a detailed knowledge of the database schema, but the database user must also understand the data access time consequences of selecting one relationship path choice over another which is more database knowledge than the average database user is often willing or able to accommodate.

SUMMARY

The above identified problems are solved and a technical advance achieved in the field by the intelligent joining system of the present invention. The intelligent joining system generates an SQL query to extract data from a database that is defined by a database schema comprised of a plurality of record sources and a plurality of relationships therebetween. The intelligent joining system is a computer operable system that includes selecting a field set containing at least one field from at least one of the plurality record sources, determining a minimal path relationship between each of the plurality of record sources in the database from which a field was selected, and generating an SQL query to extract data from the database. A record source from which a field set field was selected is called a field set record source. The minimal path relationship between field set record sources must include at least one indirect relationship.

Determining a minimal path relationship includes generating a schema graph of the database and pruning the schema graph based on fields in the field set. A schema graph includes a vertex representation for each record source in the database and an edge for each relation between record sources in the database. Pruning the schema graph is a recursive process that includes constructing a vertex set and an edge set, and pruning from the schema graph all vertices and edges in the vertex and edge sets. A vertex set contains all vertices having a single edge. An edge set contains the single edges that correspond to the single edged vertices. Following the pruning phase, the schema graph is traversed by way of the vertex set and edge set to determine the minimal path between each vertex that contains a field from the field set, where each vertex containing a field from the field set is also known as a field set vertex. If a cycle remains in the schema graph following the pruning and traversal phase, a minimal path between each field set vertex in the remaining cyclic schema graph is determined by a weighted scoring of each vertex between any two field set vertices. A tie in the weighted scoring is broken by either random selection by the intelligent joining system, or user intervention.

Output from the intelligent joining system is a Structured Query Language (SQL) statement in the syntactical form that a database management system can execute to perform a join. Additional output from the intelligent joining system can include any one or any combination of the following, including a minimal path edge set, a sub-schema graph of that sub-portion of the database defined by the field set. The outputs identified above are generated in a manner transparent to the database user.

BRIEF DESCRIPTION OF THE DRAWINGS

FIG. 1 illustrates a non-normalized flat file database in two-dimensional table form;

FIG. 2 illustrates a normalized relational database in two-dimensional table form;

FIG. 9 illustrates schema graph pruning steps in flow diagram form;

FIG. 10 illustrates pruning list traversal results in table form;

DETAILED DESCRIPTION

Figure 16:
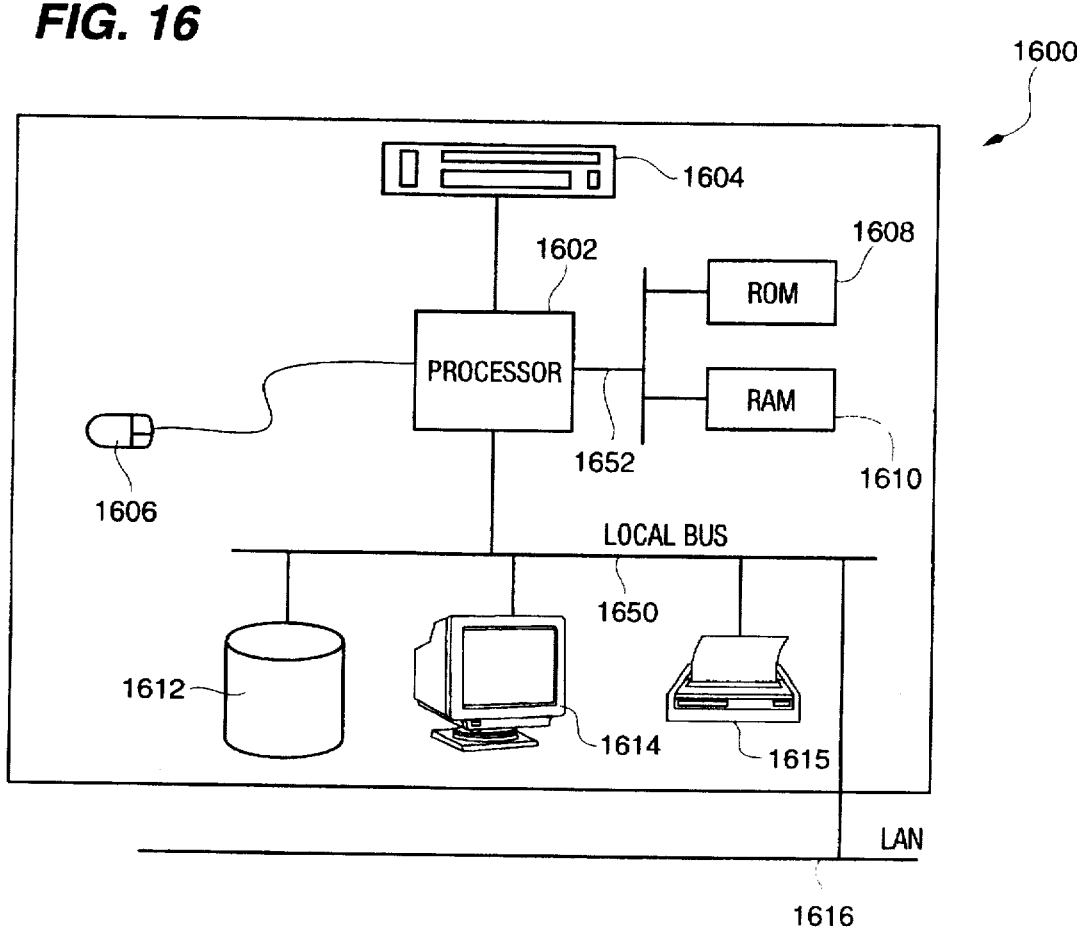
FIG. 16 illustrates a database computing environment in block diagram form.

Database Computing Environment—FIG. 16

FIG. 16 illustrates a block diagram example of a computer system 1600 in a database computing environment. The intelligent joining system of the present invention is operable in any of several standard computing systems readily available in the industry. Programmed instructions for the intelligent joining system are executable on processor 1602. Processor 1602 stores and/or retrieves the programmed instructions and/or data from memory devices that include, but are not limited to, Random Access Memory (RAM) 1610 and Read Only Memory (ROM) 1608 by way of memory bus 1652. Another accessible memory device includes non-volatile memory device 1612 by way of local bus 1650. User input to computer system 1600 is entered by way of keyboard 1604 and/or pointing device 1606. Human readable output from computer system 1600 is viewed on display 1614 or in printed "report" form on local printer 1615. Alternatively, computer system 1600 is accessible for user input and/or generating human readable displays in printed and/or display screen output form by way of Local Area Network (LAN) 1616 in a manner well known in distributed computing and computer network art.

Database Background—FIGS. 1–4

FIG. 1 illustrates a non-normalized database 100 in two-dimensional table form. Database 100 includes one record source 102 called the Employee record source because the record source contains employee information as identified by the employee record source name 105. The Employee record source 102 is illustrated as having five records 120–124 where each record contains information for a single employee. Each record 120–124 is divided by six fields 110–115 including an Employee Number field 110, a Last Name field 111, a First Name field 112, a Department Number field 113, a Department Name field 114, and a Manager field 115. The Employee Number field 110 is the only field in the Employee record source 102 that is designed to contain unique data across each record 120–124. Thus, the Employee Number field 110 is a primary key field. Because database 100 contains only one record source and because the Employee record source 102 has the likelihood of containing redundant data in any one of the Department Number 112, Department Name 113, and/or Manager 114 fields, database 100 is referred to as a non-normalized or flat file database.

FIG. 2 illustrates a normalized database 200 in two-dimensional table form. Database 200 includes an Employee record source 202 containing employee information as identified by the Employee record source name 205, and a Department record source 203 containing department information as identified by the Department record source name 208. The Employee record source 202 is illustrated as having five records 220–224 where each record contains personal information for a single employee. Each record 220–224 is divided by four fields 210–213 including an Employee Number field 210, a Last Name field 211, a First Name field 212, and a Department Number field 213. The Employee Number field 210 is the only field in the Employee record source 202 that is designed to contain unique data across each record 220–224. Thus, the Employee Number field 210 is the primary key field for the Employee record source 202. The Department Number field 213 in the Employee record source 202 does not contain unique data for each record 220–224 although the field is a foreign key field for the Employee record source 202 for the reasons discussed below.

Department record source 203 is illustrated as having two records 230–231 where each record contains detailed information for a single department. Each record 230–231 is divided by three fields 214–216 including a Department Number field 214, a Department Name field 215, and a Manager field 216. The Department Number field 214 is the only field in the Department record source 203 that is designed to contain unique data across each record 230–231. Thus, the Department Number field 214 is the primary key field for the Department record source 203. Alternatively, the Department Name field 215 could also contain unique data for each record 230–231 by design, or the combination of the Department Number field 214 and the Department Name field 215 together could create a unique primary key for the Department record source 203. However, the FIG. 2 illustration shows the Department Number field 214 in the Department record source 203 as the primary key and the Department field 213 in the Employee record source 202 as the related foreign key. The significance of the relationship between a primary key field and foreign key field in the present illustration where the relationship has a 1-to-many cardinality, is that there need only be one complete record of department information regardless of the number of employees that are in any one department. Therefore there is a memory savings and a minimization of redundant data by splitting out the department information into a separate Department record source 203 from the Employee record source 202. The splitting of record sources in the manner described above is characteristic of a normalized database also known as a relational database.

Figure 3:
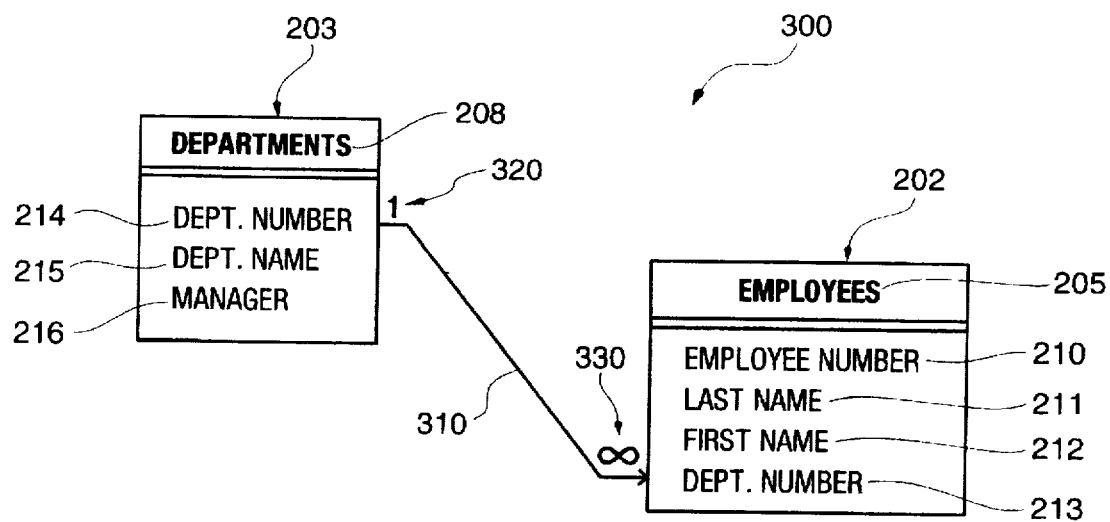
FIG. 3 illustrates a database schema in record source and relationship form.

FIG. 3 illustrates the schema graph 300 of database 200 in record source and field format. The record source and field format illustrates the Employee record source 202 and Department record source 203 with the same record source names 205 and 208, and the same fields 210–216 as previously discussed in FIG. 2. However, the 1-to-many cardinality is more clearly shown by the relationship path 310 that is connected at the primary key field end 320 to the Department Number field 214 of the Department record source 203, and at the foreign key field end 330 to the Department Number field 213 of the Employee record source 202.

Figure 4:
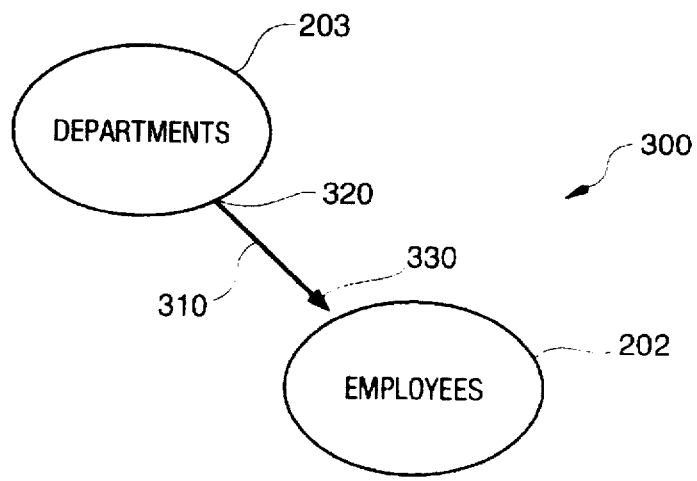
FIG. 4 illustrates a database schema in vertex and edge form.

FIG. 4 illustrates the schema graph 300 of database 200 in vertex and edge form. The vertex and edge form of schema graph 300 is used in the remaining substantive discussion of the intelligent joining system. However, it is important to note that a vertex and a record source refer to the same object in the schema graph 300, and an edge and a relation refer to the same connectivity between objects in the schema graph 300. The Department record source 203 and Employee record source 202 of FIG. 3 are the Department vertex 203 and Employee vertex 202 of FIG. 4. The 1-to-many relationship 310 illustrated in FIG. 3 is referred to as an edge 310 in FIG. 4 having an originating end 320 and a termination end 330. Although the 1-to-many cardinality exists in FIG. 4, the cardinality is not stated in FIG. 4 because only the direction of edge 310 is of significance to the present invention.

Figure 5:
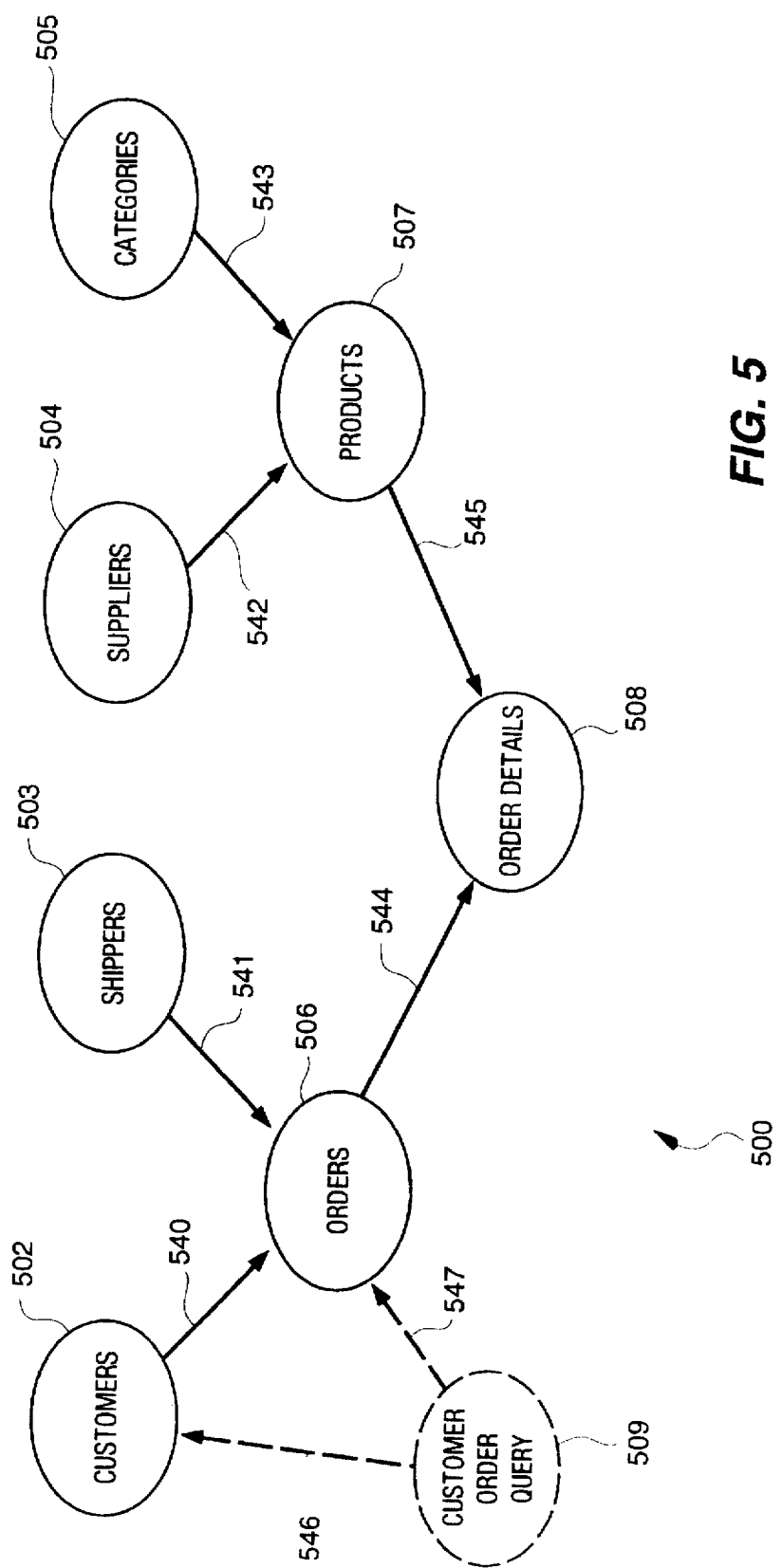
FIG. 5 illustrates a more complex relational database in vertex and edge form.
Figure 6:
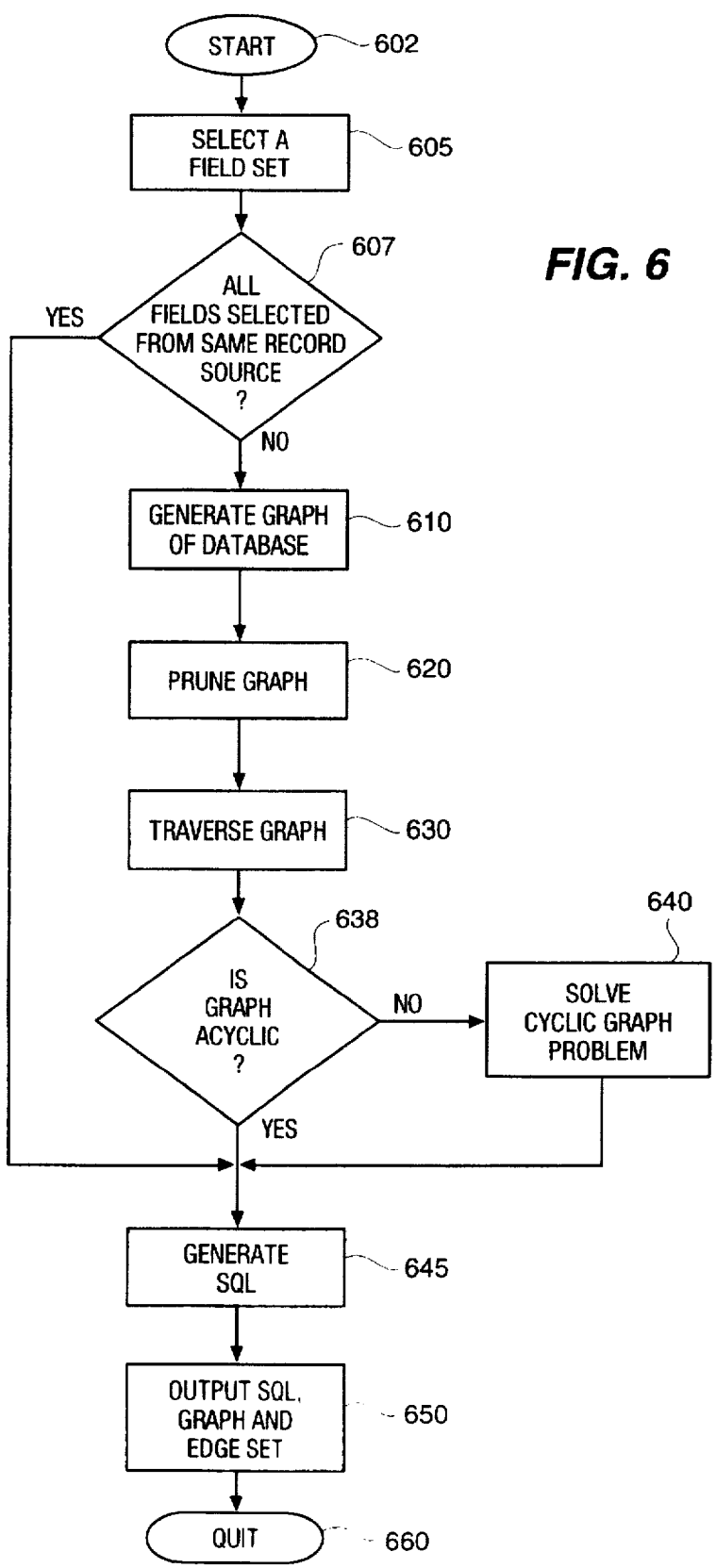
FIG. 6 illustrates an overview of the intelligent joining system in flow diagram form.

Database Joining System Overview—FIGS. 5–6

FIG. 5 illustrates a more complex schema graph 500 of a relational database in vertex and edge form. Schema graph 500 includes eight vertices, namely Customer vertex 502, Shipper vertex 503, Supplier vertex 504, Categories vertex 505, Orders vertex 506, Products vertex 507, and Order Details vertex 508. For illustration purposes the Customer Order query 509 is included in the schema graph 500 as a query vertex. Each vertex 502–509 has at least one edge either originating or terminating thereto as indicted by edges 540–547.

FIG. 6 illustrates an overview of the intelligent joining system 600 in flow diagram form. The intelligent joining system 600 starts at step 602 and generates a menu from which a field set is selected by a database user to select from at step 605. A field set is the set of one or more fields selected by a database user from the available record sources in a database schema, where the field set identifies fields from which the database user wishes to extract data from the database by way of a query.

If all the fields in the field set are selected from the same vertex at decision step 607 then the processing proceeds immediately to SQL query generation at step 645 because no joins are required to execute the query. Alternatively, if all the fields in the field set are not selected from the same vertex at decision step 607 then processing continues with graph generation for the database schema at step 610. The schema graph that is used as an example in the following discussion is the schema graph 500 in FIG. 5. A detailed discussion of schema graph generation is presented in the text accompanying FIGS. 7 and 8.

Given a graphic representation of the database schema 500, the schema graph is pruned at step 620 and traversed at step 630. A detailed discussion of schema graph pruning is presented in the text accompanying FIGS. 9 and 10. A detailed discussion of schema graph traversal is presented in the text accompanying FIGS. 11.

If the schema graph traversal step 630 results in a cyclic graph at decision step 638, then the cycle is examined and solved at step 640 prior to generating the SQL query at step 645. A detailed discussion of cyclic graph examination and resolution is presented in the text accompanying FIGS. 12–14. Alternatively, if the schema graph traversal step 630 results in an acyclic graph at decision step 638, then processing continues immediately with SQL query generating at step 645. A detailed discussion of SQL query generation at step 645 is presented in the text accompanying FIG. 15.

The SQL query generation at step 645 and all steps prior thereto are executed in a manner that is transparent to the database user and without intervention by the database user. Output from the intelligent joining system at step 650, is a complete and syntactically accurate SQL statement. Additional output from the intelligent joining system at step 650 can include a sub-schema graph of the sub-portion of the database that is defined by the field set, and an edge set of all edges required to join the sub-schema. When the output is available or otherwise complete at step 650, the intelligent joining system 600 quits at step 660 until another field set is selected at step 605.

In an alternative embodiment, the selected field set in addition to the SQL query, a sub-schema graph, and a minimal path edge set, or some unique combination of the above, can be indexed and stored in memory as a sub-schema cache for use in quickly generating an SQL query in the event a similar field set is selected in the future.

Figure 7:
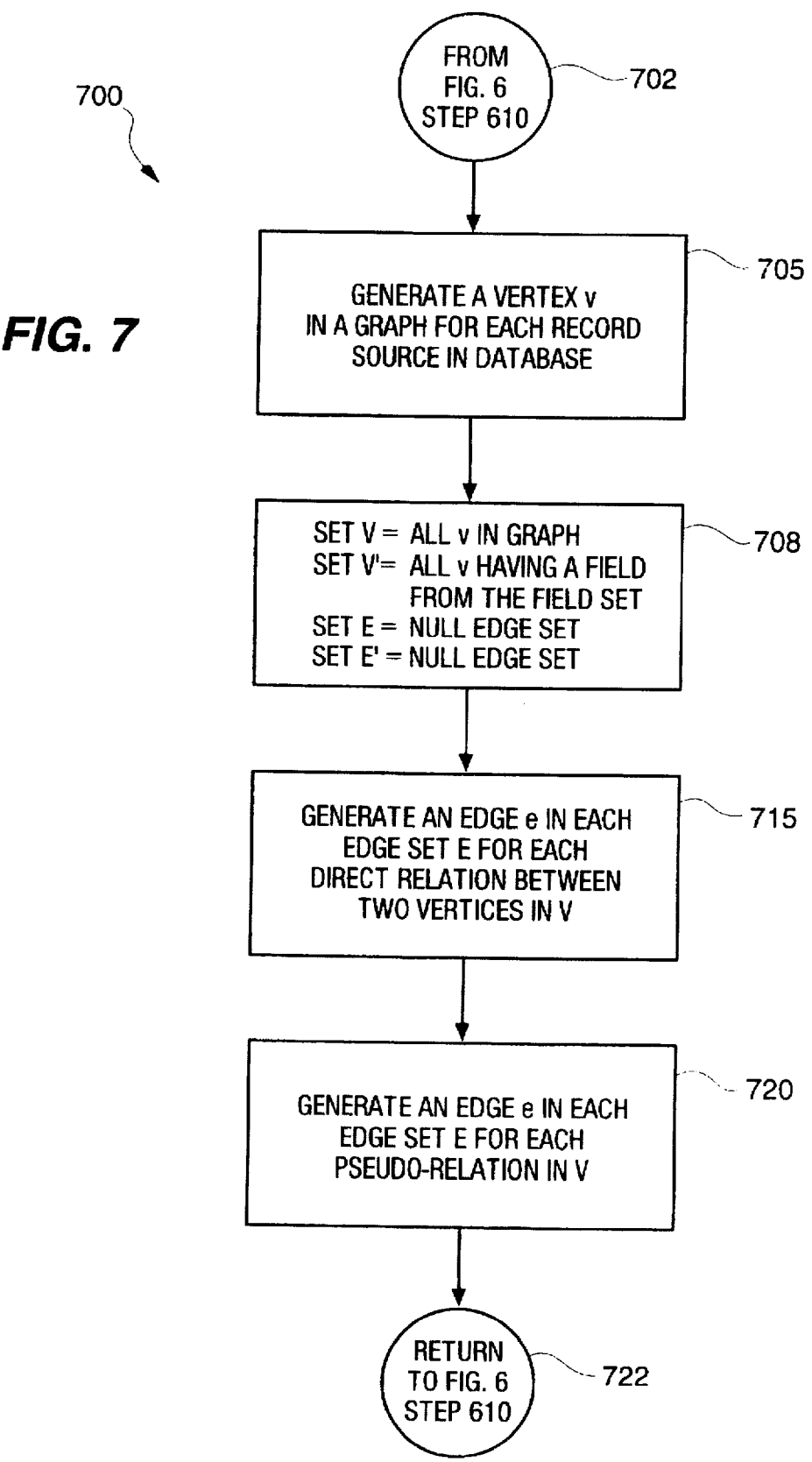
FIG. 7 illustrates schema graph generation steps in flow diagram form.
Figure 8:
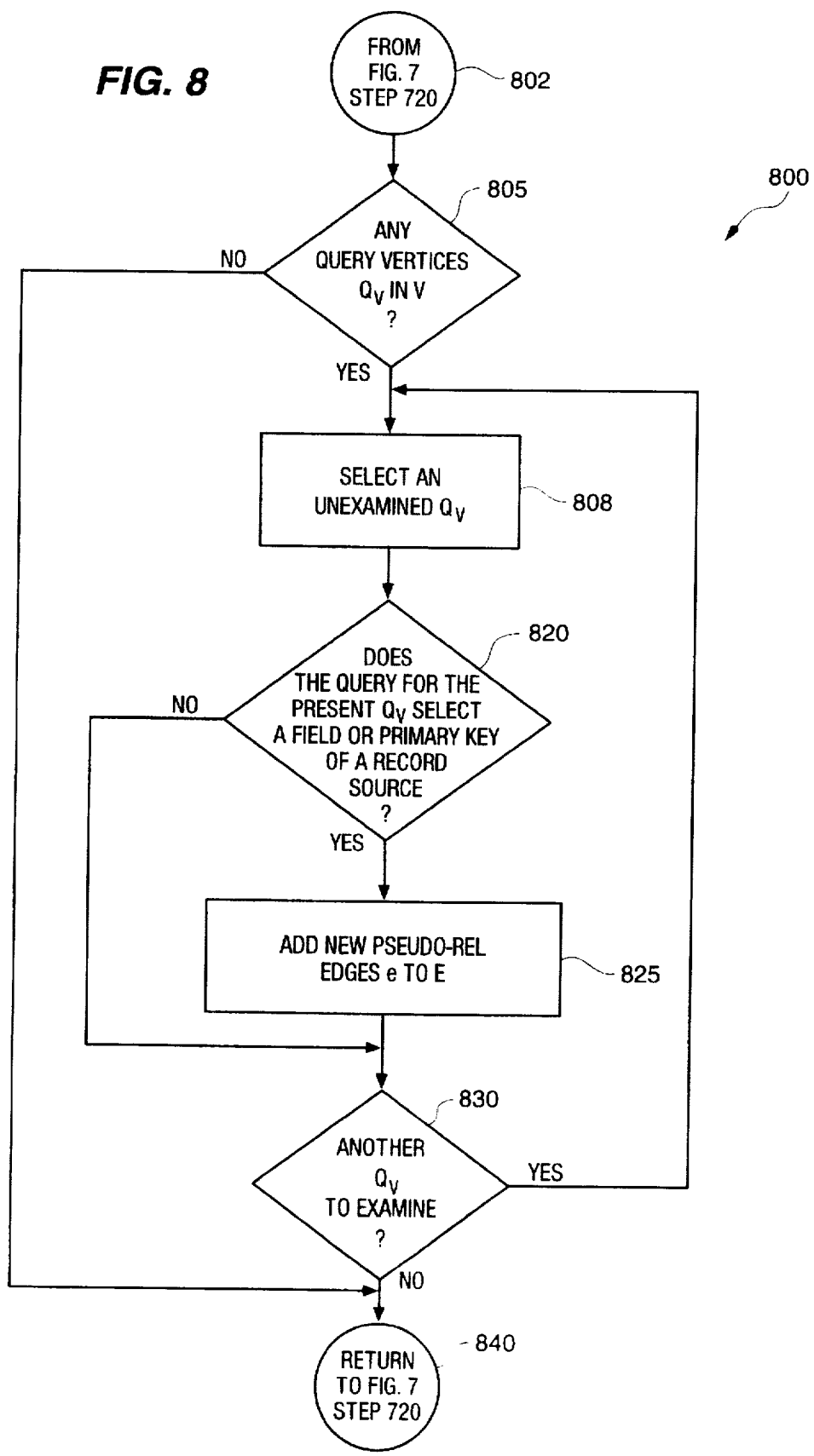
FIG. 8 illustrates pseudo-relationship generation steps in flow diagram form.

Graph Generation—FIGS. 7–8

FIG. 7 illustrates the schema graph generation operational steps 700 in flow diagram form. The schema graph generation operational steps 700 in FIG. 7 are the details of step 610 in the intelligent joining system overview 600 of FIG. 6.

Generating a schema graph begins at step 702 and proceeds by first generating a vertex v for each corresponding record source in the subject database at step 705. The graph itself in addition to each vertex v and each edge therein, is "generated" and stored as a data structure in a memory. The data structures themselves can be defined in any manner commonly known and used in the industry. At step 708 a vertex set V is created to include all vertices v in the schema graph. Additionally in step 708, the vertex sub-set V' is created to include all vertices containing a field from the field set previously selected by the database user in step 605. Also in step 708, the edge sets E and E' are created as NULL sets where E' is the set of edges present in the schema graph 500, and E is the minimal set of edges required to join the vertices from the vertex sub-set V'.

At step 715, at least one edge is generated for the schema graph 500 for each direct relation that is either pointing to or from each vertices in the vertex set V. The edges generated in step 715 are part of the edge set E.

At step 720, an edge is generated for the schema graph 500 for each pseudo-relation that is either pointing to or from a query vertices in the vertex set V. An example of a query vertex is the Customer Order query 509 in FIG. 5. A pseudo-relation is a semantic relation that does not ordinarily exist but the database user thinks of them as existing and expects them to exist. More specifically, a pseudo-relation exists between a query vertex Qv and a vertex v if the query vertex Qv contains at least one field from record source represented by vertex v. Further, if the query vertex Qv contains all fields comprising the primary key of a vertex $v_x$, then a pseudo-relation exists between query vertex Qv and vertex $v_x$ in addition to any other vertex $v_y$ related to vertex $v_x$ in the database. For example, the Customer Order query vertex 509 in FIG. 5 has pseudo-relation edges 546 and 547 to the Customer vertex 502 and the Orders vertex 506 respectively. Thus, the Customer Order query 509 may contain at least one non-key field from both vertices 502 and 506, or the Customer Order query 509 may contain the primary key field of the Customer vertex 502 and therefore the foreign key field of the Order query 509. A detailed discussion of pseudo-relation generation is presented in the text accompanying FIG. 8.

FIG. 8 illustrates pseudo-relation generation operational steps 800 in flow diagram form. The pseudo-relation generation operational steps 800 are details of step 720 in FIG. 7. The pseudo-relation generation operational steps 800 begin at step 802 and proceed to decision step 805 to determine if there is a query vertex Qv in the vertex set V. If there is no query vertex Qv in the vertex set V at decision step 805 then processing proceeds immediately to step 840 and no pseudo-relations are generated. Alternatively, if there is at least one query vertex Qv in the vertex set V at decision step 805 then processing continues at step 808 where an unexamined query vertex Qv is selected for evaluation.

If the query for the query vertex Qv presently being evaluated does not select either at least one field or the entire primary key of a record source at decision step 820, then processing continues at decision step 830. If the query for the query vertex Qv presently being examined does select either at least one field or the entire primary key of a record source at decision step 820, then pseudo-relation edges e are added to the edge set E at step 825 as appropriate. That is, an edge e is added to the edge set E to represent a pseudo-relation between the examined query vertex $Qv_e$ and any other vertex $v_x$ which may include a query vertex $Qv_x$, for any of the following conditions: 1) the examined query vertex $Qv_e$ contains at least one non-primary key field from the record source represented by a vertex $v_x$ or a query vertex $Qv_x$; 2) the present query vertex $Qv_e$ contains the primary key of a vertex $v_x$; or 3) the present query vertex $Qv_e$ contains the primary key of a vertex $v_x$ and a relation exists between the vertex $v_x$ and at least one other vertex $v_y$.

If the vertex set V contains any other unexamined query vertex Qv at decision step 830 then processing continues at step 808 where a next unexamined query vertex Qv is selected for examination. If the vertex set V does not contain an unexamined query vertex Qv at decision step 830 then the pseudo-relation generation process ends at step 840.

Graph Pruning—FIGS. 9–10

FIG. 9 illustrates graph pruning operational steps 900 in flow diagram form for the schema graph 500 without query vertex 509. The graph pruning operational steps 900 are details of step 620 in FIG. 6. The purpose of graph pruning is to recursively identify any leaf vertex in the graph, and systematically catalog and remove each leaf vertex and its corresponding edge in an ordered manner.

The graph pruning operational steps 900 begin at step 902 and proceed to step 908 to select an unexamined vertex v from the vertex set V to determine if the vertex is a leaf vertex. A leaf vertex is a vertex that is connected to the graph by only one edge regardless of the direction of the edge. If it is determined that the vertex v is connected to another vertex in the graph by more than one edge at decision step 910 then processing continues at decision step 925. Decision step 925 determines whether or not there is an unexamined vertex v remaining in the graph. If it is determined that the vertex v is a leaf vertex at decision step 910, then processing continues at step 912 where the single edge connecting the present vertex v is added to the set of pruned edges eP. The present vertex v under examination is itself added to the set of pruned vertices vP at step 915. The vertex v under examination and its edge are then pruned or removed from the schema graph at step 920. If an unexamined leaf vertex remains in the vertex set V at decision step 925, then processing continues at step 908 where a next unexamined leaf vertex is selected for pruning. If no unexamined leaf vertex remains in the vertex set V at decision step 925, then the pruning process ends at step 930.

FIG. 10 illustrates a pruning table 1000 containing the results of pruning schema graph 500 in the manner described in the text accompanying FIG. 9. Each pruned vertex 1010-1015 is in the pruned vertices vP column 1002 portion of the pruning table 1000. Each pruned edge 1020-1025 is in the pruned edges eP column 1003 portion of the pruning table 1000.

Using the schema graph 500 to illustrate the pruning process, Customer vertex 502 is a leaf vertex that is selected in step 908. The present pruning example assumes that the Customer Order query vertex 509 does not exist. Because Customers 502 is connected by only one edge 540 as determined at decision step 910, the edge 540 is added at step 912 to the pruned edges eP 1003 column of the pruning table 1000 as Customers→Orders 1020. The leaf vertex Customers 502 is added at step 915 to the pruned vertices vP 1002 column of the pruning table 1000 as Customers 1010. Both the edge 540 and the leaf vertex Customers 502 are pruned from the schema graph 500 at step 920. Pruning continues at decision step 925 where it is determined that the leaf vertices Shippers 503, Suppliers 504, and Categories 505, are each connected by only one edge 541, 542, and 543 respectively, and therefore each leaf vertices is pruned from schema graph 500 in a manner as previously described. The pruning table 1000 at the conclusion of pruning leaf vertices 503-505 and their edges 541-543, is a pruned vertices vP column 1002 that includes Shippers 1011, Suppliers 1012, and Categories 1013, and a pruned edge eP column 1003 that includes Shippers→Orders 1021, Suppliers→Products 1022, and Categories→Products 1023.

The result of recursively pruning schema graph 500 is that new leaf vertices exist, namely Orders 506 and Products 507. The pruning table 1000 at the conclusion of pruning leaf vertices 506-507 and their edges 544 and 545, is a pruned vertices vP column 1002 including Orders 1014 and Products 1015, and a pruned edge eP column 1003 that includes Orders→Order Details 1024 and Products→Order Details 1025. The last remaining vertex Order Details 508, is not pruned because it has no accompanying edge at this point in the pruning process.

Figure 11:
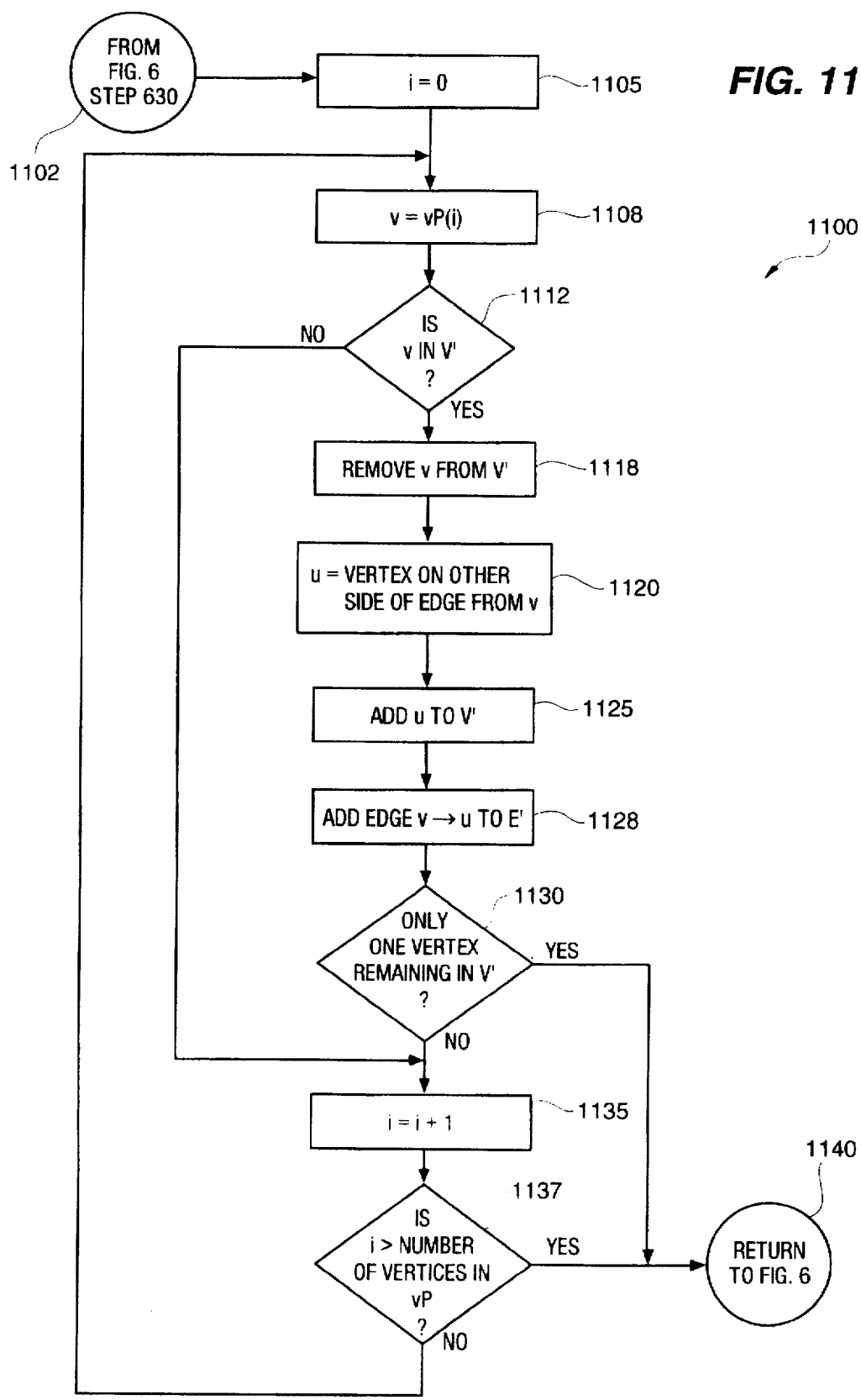
FIG. 11 illustrates pruning list traversal steps in flow diagram form.

Graph Traversal—FIG. 11

FIG. 11 illustrates traversal operational steps 1100 in flow diagram form. The traversal operational steps 1100 are details of step 630 in FIG. 6. Graph traversal completes the graph pruning process described in the text accompanying FIG. 10. The purpose of graph traversal is to identify the minimal or shortest path between any two fields in the vertex sub-set V' from step 605 of FIG. 6. At the completion of the graph traversal operational steps 1100 the minimal path relationships are identified for any acyclic graph.

The graph traversal operational steps 1100 begin at step 1102 and proceed to step 1105 where the counter "I" is initialized to zero. At step 1108 the vertex variable v is set to the th vertex in the pruned vertex list vP(I). If the vertex v is not one of the vertices in V' at decision step 1112, where V' is the set of vertices containing at least one selected field set field, then processing continues at step 1135. If the vertex v is one of the vertices in V' at decision step 1112 then the vertex v is removed from the set V' at step 1118 and the vertex variable u is set to the related vertex at the other side of the edge from v at step 1120. The vertex u is added to the set V' at step 1125 and the edge v→u is added to the minimal edge set E' at step 1128. If there is only one vertex remaining in the set V' at decision step 1130 then a minimal path solution exists in E' and the traversal processing is complete at step 1140. If there are at least two vertices remaining in the set V' at decision step 1130 then the counter variable "I" is incremented at step 1135 and the variable "I" is tested at decision step 1137 to determine if the counter has exceeded the number of possible vertices in the pruned vertices column vP. If the counter "i" exceeds the number of possible vertices in vP then a cyclic graph has been identified that requires additional processing after the present graph traversal processing completes at step 1140. If the counter "i" does not exceed the number of possible vertices in vP then traversing continues at step 1108 as described above.

As an example of the graph traversal operational steps 1100 assume that the minimal edge set E' is NULL and the set V' includes {Customers, Categories} which are the fields selected in the field set at the FIG. 6 step 605. The pruning table sets vP and eP are as illustrated in FIG. 10. In a first pass through the graph traversal operational steps 1100 v=Customers in step 1108 and because v is represented in the set V at decision step 1112, v is removed from V' at step 1118. Variable u=Orders in step 1120 and u is added to the set V' at step 1125. The edge Customers→Orders is added to the minimal edge set E' in step 1128. At the end of the first pass V'={Orders, Categories} and E'={Customers→Orders}.

At the completion of the second pass through the graph traversal operational steps 1100, V'={Orders, Products} and E'={Customers→Orders, Categories→Products}. At the completion of the third pass through the graph traversal operational steps 1100, V'={Order Details, Products} and E'={Customers→Orders, Orders→Order Details, Categories→Products}. At the completion of the fourth pass through the graph traversal operational steps 1100, V'={Order Details} and E'={Customers→Orders, Orders→Order Details, Categories→Products, Products→Order Details}. Because there is only one vertex in the set V' at the completion of graph traversal the graph of database 500 is said to be an acyclic graph where there is a single minimal path between any two vertices in the graph.

Figure 12:
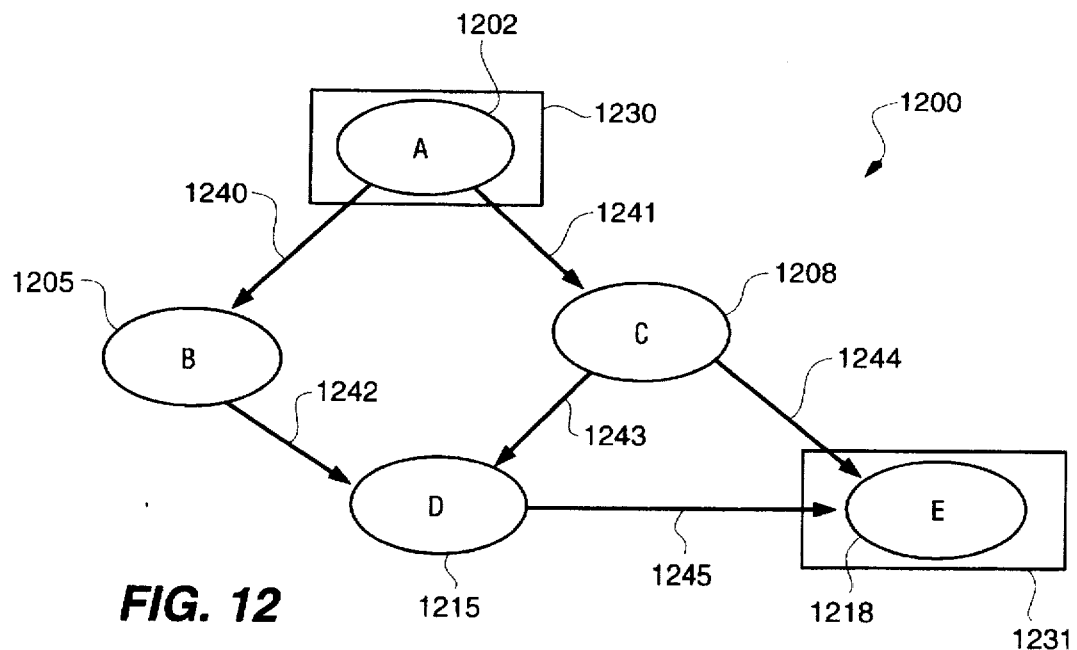
FIG. 12 illustrates a cyclic schema graph in vertex and edge form.
Figure 13:
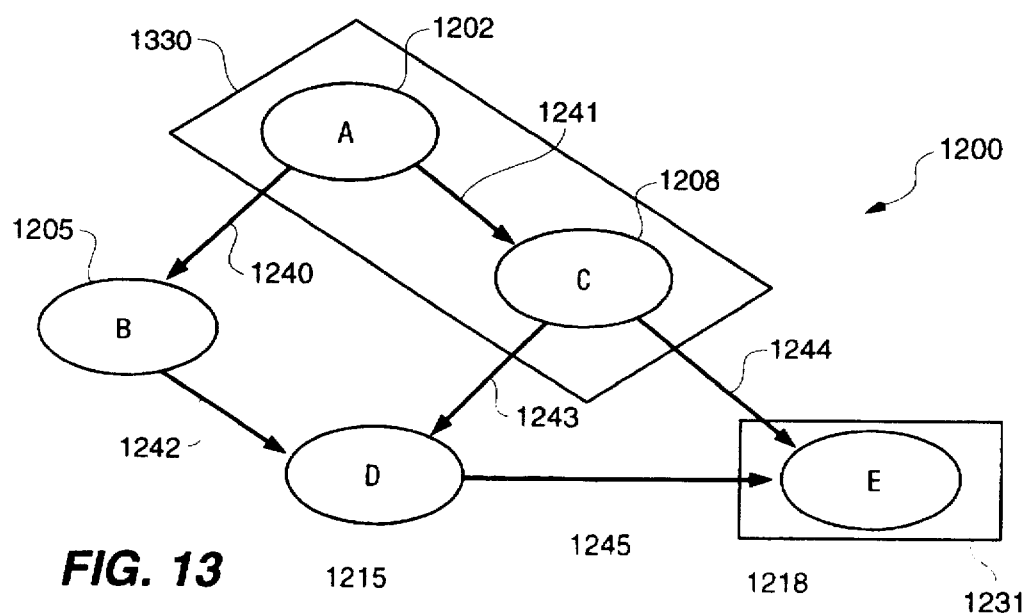
FIG. 13 illustrates a cyclic schema graph component collection in vertex and form.
Figure 14:
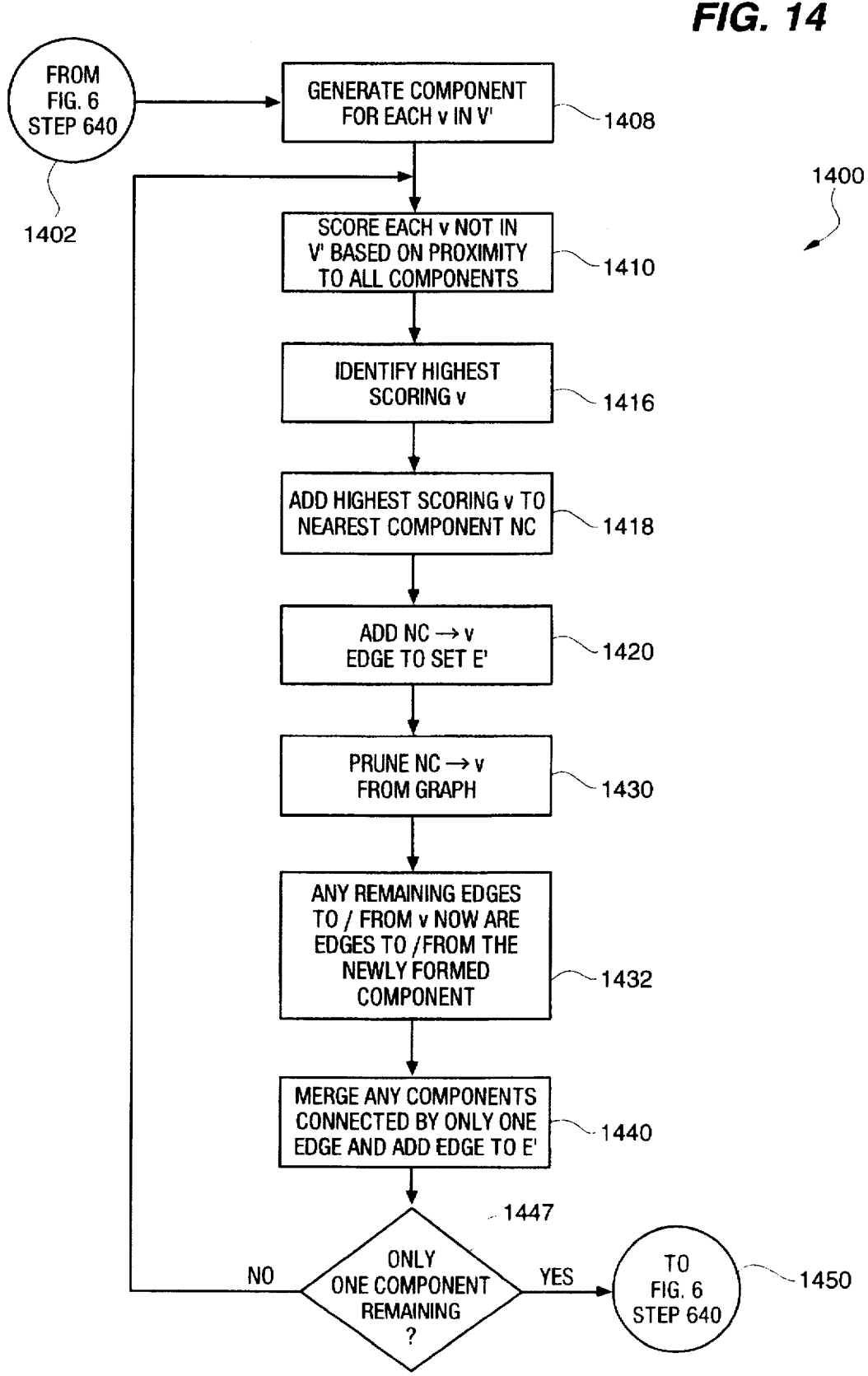
FIG. 14 illustrates cyclic schema graph resolution steps in flow diagram form.

Cyclic Graph Solution—FIGS. 12-14

A cyclic graph problem exists if the graph traversal operational steps 1100 complete processing because the counter "i" in FIG. 11 exceeded the number of vectors in the pruned vertex set vP. A cyclic graph is a graph where there is more than one relationship path between two vertices. The problem presented by the existence of a cyclic graph is that it is difficult for an automated system to identify the minimal relationship path between two vertices. FIG. 12 illustrates a cyclic graph 1200 of a database having five vertices 1202-1206 named A–E respectively. The vertices 1202-1206 are connected by at least one edge 1240-1245. For example purposes, assume that vertices A 1202 and E 1206 represent tables containing fields from the field set V' selected in FIG. 6 step 605. Thus, the problem is to identify which of the possible paths A→B→D→E, or A→C→D→E, or A→C→E between vertices A 1202 and E 1206 is the minimal relationship path for purposes of joining.

FIG. 14 illustrates the cyclic graph solution operational steps 1400 in flow diagram form. The cyclic graph solution operational steps 1400 are details of step 640 in the intelligent joining system overview 600 of FIG. 6. The cyclic graph solution operational steps 1400 begin at step 1402 and proceed to generating a component for each cyclic graph vertex v in the vertex sub-set V' where V' is the set of all record sources containing at least one field from the field set selected in step 605 of FIG. 6. Initially, one component exists for each vertex in the set V'. In the end, a component is a consolidation of vertices and edges from the graph. In step 1410, each vertex v that is not in the set V' is scored based on the vertex's average proximity to any component in the cyclic graph. The vertex v having the highest score is identified in step 1416 and that vertex v is added to its nearest component at step 1418. The edge between the original component and the vertex v is added to the minimal relationship path set E' at step 1420, and the edge is pruned from the graph at step 1430. Any other edges directed to or from vertex v point to or from the component containing vertex v at step 1432. After the consolidating of vertex v into the original component there may be two components connected by way of a single edge. Therefore, step 1440 merges any one component that is connected to any other component by only one edge. If there is only one component remaining in the cyclic graph at decision step 1447, then a minimal path solution exists in the edge set B and processing is complete at step 1450. If there is more than one component remaining in the cyclic graph at decision step 1447, then processing continues at step 1410 as described above.

An example of the cyclic graph solution operational steps 1400 applied to cyclic graph 1200 in FIGS. 12-13 proceeds in the following manner. FIG. 12 as introduced previously, is a cyclic graph where vertices A 1202 and E 1206 are members of the set V' and therefore components between which a minimal relationship path is being identified. A component is identified by a rectangle as illustrated by components 1230 and 1231 for vertices A 1202 and E 1206 respectively. Scoring each vertex v that is not in the set V' at step 1410 can occur in any manner that reflects the proximity of any one vertex to respective components in the graph. In the present example vertex C 1204 is the highest scoring vertex in the cyclic graph due to its proximity to components A 1230 and E 1231. Therefore, vertex C 1204 is added to component A 1230 to create a component AC 1330 as illustrated in FIG. 13. The edge 1241 between vertex A 1202 and C 1204 is added to the edge set E' along with any other edges identified by the pruned graph traversal operational steps 1100. Because component AC 1330 is separated from component E 1231 by only one edge 1244 in FIG. 13, the component E 1231 is merged into component AC 1330 and the edge 1244 therebetween is added to the edge set E'. Because the consolidating of component AC 1330 and component E 1231 leave only one component remaining in the cyclic graph 1200, the cyclic graph processing is complete and the minimal relationship path between vertex A and vertex E is solved as A→C→E.

Multiple techniques for scoring the proximity of a vertex relative to all components in a graph are known and available in the art. One well known technique is the Carp heuristic function that relies on identifying all optional vertices at once by ordering the distances from a vertex to each component in the graph. A pseudo-code example of the Carp techniques is as follows:

| CarpOptionalVertex() |
| --- |
| for all optional vertices o<br>{<br>    number the components in increasing order of their distance from o<br>      e.g.: $dist(o,c_1) <= dist(o,c_2) <= dist(o,c_3)\ldots$<br>    $score_{best} = \infty$<br>    $i_{best} = 0$    $'i_{best}$ tracks the connectedness of optional vertices o<br>    k = 2<br>    $score = dist(o,c_1) + dist(o,c_2)$<br>    while $(dist(o,c_{(k+1)}) <= score_{best})$<br>    {<br>        k=k+1<br>        $score = (dist(o,c_1) + dist(o,c_2) + \ldots + dist(o,c_k))/(k-1)$<br>    }<br>    if $(score <= score_{best})$ and $(I > i_{best})$<br>    {<br>        $score_{best} = score$<br>        $i_{best} = 1$<br>        $o_{best} = o$<br>    }<br>}<br>return($o_{best}$) |

However, the extra steps and added complexity of the Carp technique above make the simpler alternative, although perhaps less optimal, Rayward-Smith and Claire technique below more desirable. Further, given the number of vertices being processed for any scoring operation in the present invention, any processing efficiency afforded by using the Carp technique is de minimis in view of the less complex Rayward-Smith and Claire technique illustrated in a pseudo-code example below. Note that either of the disclosed known techniques, or any other known scoring technique, can be used in the scoring process.

| RaywardSmithVertexScore() |
| --- |
| $score_{best} = \infty$<br>$r_{best} = 0$    $'r_{best}$ tracks the connectedness of optional vertices o<br>for r = 1 to ICI-1<br>{<br>    score = 0<br>    for I = 0 to r<br>    {<br>        $score = score + (dist(o,c_i) / r)$<br>        'where $c_0, c_1, c_2, \ldots c_{(n-1)}$ are components |

-continued

```
RaywardSmithVertexScore()

}
   if (score <= score_best) and (r > r_best)
   {
        score_best = score
        r_best = r
   }
}
return(score_best, r_best)
```

Figure 15:
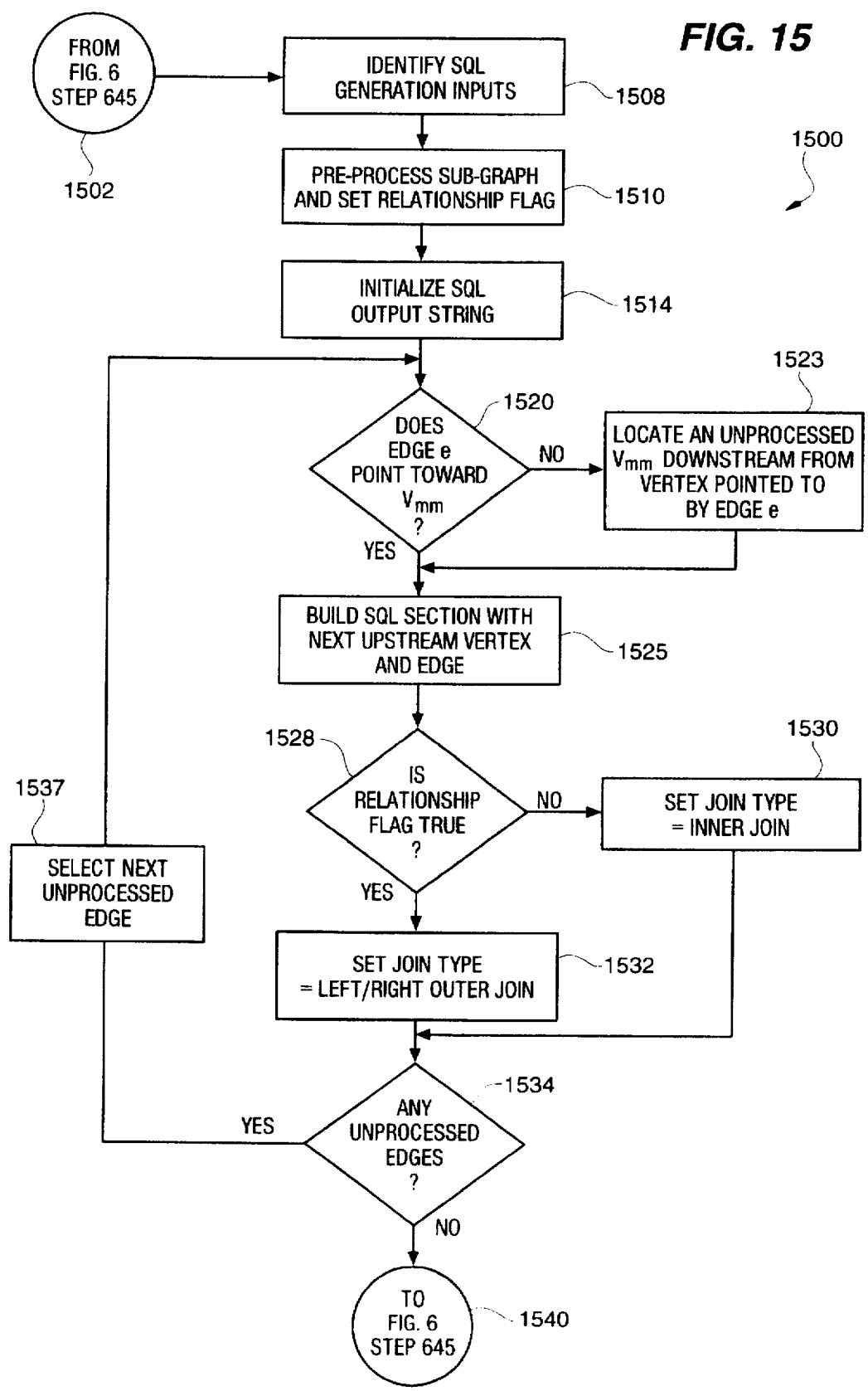
FIG. 15 illustrates the SQL generation operational steps in flow diagram form.

Generating a Structured Query Language Statement—FIG. 15

FIG. 15 illustrates the SQL generation operational steps 1500 in flow diagram form. The SQL generation operational steps 1500 are the details of step 645 in the intelligent joining system overview 600 of FIG. 6. The purpose of SQL generation is to produce a syntactically and substantively valid SQL statement such as the generic example illustrated below.

```
SELECT DISTINCTROW
    [rs1].[f1], [rs2].[f2], [rs3].[f3]
FROM
    (([rs1] {JOIN TYPE} [rs2] ON {FIELDS}) {JOIN TYPE} [rs3] ON
{FIELDS})
``` where SELECT DISTINCTROW and FROM are constants, and [rs1].[f1], [rs2].[f2], [rs3].[f3] are field set fields of respective record sources constructed from the original field set. The fourth line is constructed from the acyclic sub-graph evolution based on the original field set.

The SQL generation operational steps 1500 begin at step 1502 and proceed to identifying SQL generation inputs at step 1508. The SQL generation inputs include, but are not limited to, a sub-graph G comprising a plurality of individual vertices v at least one of which is a most many vertex Vmm, and a vertex v from the vertex sub-set V'. In the graph 500 of FIG. 5, vertex 508 is a most many vertex Vmm.

At step 1510 the sub-graph G is pre-processed to evaluate the relationship types in the sub-graph. Relationships in a graph, or join types in the present context, are marked with attributes that include, but are not limited to, dbRelationLeft and dbRelationRight for a "left outer relationship" or "join" and a "right outer relationship" or "join" respectively. An inner join is another type attribute. In general, an inner join is a join in which at least one record from each of two record sources are combined in the result set of a query only if the values in the fields of each record satisfy a pre-determined condition. For example, the pre-determined condition may be that the values in the fields of each record are equal. In contrast, an outer join is a join in which at least one record from each of two record sources are combined in the result set of a query regardless of any condition. The left versus right aspect of an outer join relates only to the direction of the relationship arrow between two record sources. Identifying the relationship or join type between record sources can facilitate generating a more accurate SQL statement. Therefore, in view of an evaluation of the join types, if left and right join types can be distinguished from each other and from inner joins for all edges that are part of the solution, then the fUseRelDir relationship flag is set to TRUE for later use in SQL generation processing.

The SQL statement generated by the operational steps 1500 is output as a string that becomes the {FIELDS} token. To begin building such a string, the SQL output string is initialized to the name of the most-many vertex Vmm that is input to the SQL generation operational steps 1500. The remaining steps beginning with decision step 1520 occur for each edge e in the sub-graph G. Note that the SQL generation operational steps 1500 are recursive so that it calls itself for each edge e of each vertex v in sub-graph G.

If the present edge e points toward vertex Vmm at decision step 1520, then a section of the SQL output string is constructed as between the present vertex and the vertex pointed to by edge e at step 1525. If the present edge e points away from vertex Vmm at decision step 1520, then a new Vmm vertex is located that is downstream from the vertex at the originating end of present edge e at step 1523, and a section of the SQL output string is constructed as previously discussed. If the relationship flag is TRUE at decision step 1528, then the Left or Right Outer Join relationship type is identified at step 1532. Alternatively, if the relationship flag is FALSE at decision step 1528, then the relationship type defaults to an Inner Join relationship type at step 1530.

If additional unprocessed edges e exist in sub-graph G at decision step 1534, then a next unprocessed edge e is selected at step 1537 and processing continues as discussed above at decision step 1520. If no unprocessed edges e exist in sub-graph G at decision step 1534, then processing continues at step 1540 where the overview step 645 of FIG. 6 is complete and an SQL output string is made available to the process originally invoking the intelligent joining system of the present invention.

A pseudo-code example of the recursive SQL generation operational steps 1500 is as follows:

```
Function BuildSQL(G, v)

'G = input sub-graph; v = input vertex.
'NOTE: Initially, v is a most-many vertex.
'During recursion, however, v may or may not be a most-many vertex.
'Nothing to do if this vertex has been processed.
If (v has been processed)
    Return ""
Else
    Mark v as processed and continue
    'Initialize our output with just the name of the
    'table or query that v represents in G.
    SqlStrOut = "[" + name_of_v + "]"
    'Look at all edges in G.
    For all edges, e, in G
        'Build a string for the {FIELD} token using fields on either side of edge e.
        JoinFieldsStr = CalcJoinClause(e)
        'Does this edge point "in" towards v?
```

-continued

```
Function BuildSQL(G, v)

If (e points towards v)
        Build an SQL section with the next upstream vertex.
        SqlStrTmp = BuildSQL(G, v)
        If (SqlStrTmp <> "") Then
            SqlStrOut = "(" & SqlStrTmp & JoinTypeofEdge(e) &
                        SqlStrOut & "ON" & JoinClauseStr & ")"
        End If
    'During recursion, BuildSQL may be passed a vertex
    'that is not most many. Therefore, locate a new V that is
    'downstream from the vertex at the originating end of edge e.
    Else If (e points away from v)
        vTmp = Other point in e.
        If (vTmp has not been processed)
            vTmp2 = Most many vertex "below" vTmp
            SqlStrTmp = BuildSQL(G, vTmp2)
        End If
        'Build an SQL section.
        SqlStrOut = "(" & SqlStrOut & JoinTypeOfEdge(e) & SqlStrTmp
                    & "ON" & JoinFields & ")"
    End If
    End For All
    Return SqlStrOut
End Function
```

A pseudo-code example of the relationship type identification operational step 1528, 1530, and 1532, for the {JOIN TYPE} token of the SQL statement is as follows:

```
Function JoinTypeofEdge(e)

If (fUseRelDir) Then
        If (e.lAttributes And dbRelationLeft) Then
            stOut = "LEFT OUTER JOIN"
        ElseIf (e.lAttributes And dbRelationRight) Then
            stOut = "RIGHT OUTER JOIN"
        Else
            stOut = "INNER JOIN"
        End If
    Else
        stOut = "INNER JOIN"
    End If
    Return stOut
End Function
```

SUMMARY

A system for generating an SQL query to extract data from a database wherein the database includes a schema defined by a plurality of record sources and a plurality of relationships therebetween. The system includes selecting a field set containing at least one field from among said plurality record sources in said database, and determining a minimal path relationship between each of the plurality of record sources in the database that contain at least one field from the field set. The minimal path relationship includes at least one indirect relationship between two of the plurality of record sources in the database that contain at least one field from the field set. Output from the joining system is an SQL in the syntactical form that a database management system can execute. Additional output can include an edge set containing the minimal paths between record sources that contain a field from the field set, and a graph of the sub-schema defined by the field set. Although specific embodiments are disclosed herein, it is expected that persons skilled in the art can and will design alternative normalized database joining systems that are within the scope of the following claims either literally or under the Doctrine of Equivalents.

What is claimed is:

1. A computer operable method for automatically generating a structured query language query to extract data from a database wherein said database includes a schema defined by a plurality of record sources and a plurality of relationships therebetween, said method comprising:

selecting a field set containing at least one field from among said plurality record sources in said database;

determining a minimal path relationship between each of a plurality of field set record sources wherein each of said plurality of field set record sources contains at least one field from said field set and wherein said minimal path relationship includes at least one indirect relationship;

generating a graph of a sub-schema of said database wherein said sub-schema is defined by said plurality of field set record sources and said minimal path relationship among said plurality of field set record sources; and generating said structured query language query based on said sub-schema and said minimal path relationship between each of said plurality of field set record sources.

2. A method according to claim I wherein said step of determining a minimal path relationship includes:

generating a graph of said database wherein said graph includes a vertex for each record source therein and an edge for each relationship between two record sources and wherein each said relationship between two record sources can include a pseudo-relation between a first vertex representing a query-type record source and a second vertex representing another record source;

generating a single edge vertex set that includes each single edge vertex in said graph that is connected to said graph by only one edge;

generating a direct relation edge set that identifies each direct relation for each said single edge vertex in said graph; and generating a minimal path edge set that identifies each direct relation between a first field set vertex and a second field set vertex and any intervening non-field set vertex therebetween in said graph wherein said field set vertex is a vertex in said graph that represents a record source containing at least one field from said field set and wherein said minimal path edge set is derived from said direct relation edge set.

3. A system for generating a structured query language statement to extract data from a database wherein said database includes a schema defined by a plurality of record sources and a plurality of relationships therebetween, said system comprising:

means for selecting a field set containing at least one field from among said plurality record sources in said database;

means for determining a minimal path relationship between each of a plurality of field set record sources in said database wherein said each of said plurality of field set record sources contains at least one field from said field set wherein said minimal path relationship includes at least one indirect relationship between any two of said plurality of field set record sources; and means for generating said structured query language statement based on said plurality of field set record sources and said minimal path relationship between each of said plurality of field set record sources.

4. A system according to claim 3 wherein said means for selecting a field set includes:

means for selecting said database by way of user input command;

means for generating a display of a plurality of fields in said plurality of record sources in said database; and means for selecting said field set from among said plurality of fields by way of a user input command.

5. A system according to claim 3 wherein said means for determining a minimal path relationship includes:

means for generating a graph of said database wherein said graph includes a vertex for each record source therein and an edge for each relationship between two record sources and wherein each said relationship between two record sources can include a pseudo-relation between a first vertex representing a query-type record source and a second vertex representing another record source;

means for generating a single edge vertex set that includes each single edge vertex in said graph that is connected to said graph by only one edge;

means for generating a direct relation edge set that identifies each direct relation for each said single edge vertex in said graph; and means for generating a minimal path edge set that identifies each direct relation between a first field set vertex and a second field set vertex and any intervening non-field set vertex therebetween in said graph wherein said field set vertex is a vertex in said graph that represents a record source containing at least one field from said field set and wherein said minimal path edge set is derived from said direct relation edge set.

6. A system according to claim 5 wherein said means for generating a single edge vertex set includes:

means for recursively examining each vertex in said graph in a manner comprising:

means for identifying said single edge vertex in said graph;

means for adding said single edge vertex to said single edge vertex set; and means for pruning said single edge vertex from said graph.

7. A system according to claim 5 wherein said means for generating a direct relation edge set includes:

means for recursively examining each vertex in said graph in a manner comprising:

means for identifying said single edge vertex in said graph;

means for adding said direct relation edge corresponding to said single edge vertex to said direct relation edge set; and means for pruning said direct relation edge from said graph.

8. A system according to claim 5 wherein said means for generating a minimal path edge set includes:

means for recursively examining said single edge vertex set in a manner comprising:

means for identifying a single edge vertex in said single edge vertex set wherein said single edge vertex is also a field set vertex;

means for adding said direct relation edge to said minimal path edge set for said direct relation edge corresponding to said single edge vertex; and means for replacing said single edge vertex in said single edge vertex set with a replacement vertex wherein said single edge vertex is on an originating end of said direct relation edge and said replacement vertex is on a terminating end of said direct relation edge; and means for adding at least one additional direct relation edge to said minimal path edge set for a minimal path between a first field set vertex and second field set vertex in a region of said graph that is identified as a cyclic graph.

9. A system according to claim 8 wherein said means for adding at least one additional direct relation edge includes:

means for defining a component for each said field set vertex in said cyclic graph; and means for recursively consolidating each said non-component vertex with one of said components until only one component remains in said cyclic graph, wherein said means for recursively consolidating comprises:

means for assigning a weighted score to each non-component vertex in said cyclic graph wherein said weighted score is based on an average proximity of each said non-component vertex to each component;

means for consolidating a highest scoring non-component vertex into a nearest component; and means for adding a direct relation edge from between said highest scoring non-component vertex and said nearest component to said minimal path edge set.

10. A system according to claim 9 wherein said means for consolidating includes: means for resolving a tie in a weighted scoring by random selection.

11. A system according to claim 9 wherein said means for consolidating includes:

means for resolving a tie in a weighted scoring by user intervention.

12. A system according to claim 3 including:

means for generating a graph of a sub-schema of said database wherein said sub-schema is defined by said plurality of record sources in said database that contain at least one field from said field set; and means for generating a minimal set of said plurality of relationships.

13. A program storage device readable by a computer, tangibly embodying instructions executable by said computer to perform method steps for generating a structured query language statement to extract data from a database, wherein said database includes a schema defined by a plurality of record sources and a plurality of relationships therebetween, said method comprising:

- selecting a field set containing at least one field from among said plurality record sources in said database;
- determining a minimal path relationship between each of a plurality of field set record sources in said database wherein each of said plurality of field set record sources contains at least one field from said field set and wherein said minimal path relationship includes at least one indirect relationship between any two of said plurality of field set record sources; and
- generating said structured query language statement based on said plurality of field set record sources and said minimal path relationship between each of said plurality of field set record sources.

14. A method according to claim 13 wherein said step of selecting a field set includes:

- selecting said database by way of user input command;
- generating a display of a plurality of fields in said plurality of record sources in said database; and
- selecting said field set from among said plurality of fields by way of a user input command.

15. A method according to claim 13 wherein said step of determining a minimal path relationship includes:

- generating a graph of said database wherein said graph includes a vertex for each record source therein and an edge for each relationship between two record sources and wherein each said relationship between two record sources can include a pseudo-relation between a first vertex representing a query-type record source and a second vertex representing another record source;
- generating a single edge vertex set that includes each single edge vertex in said graph that is connected to said graph by only one edge;
- generating a direct relation edge set that identifies each direct relation for each said single edge vertex in said graph; and
- generating a minimal path edge set that identifies each direct relation between a first field set vertex and a second field set vertex and any intervening non-field set vertex therebetween in said graph wherein said field set vertex is a vertex in said graph that represents a record source containing at least one field from said field set and wherein said minimal path edge set is derived from said direct relation edge set.

16. A method according to claim 15 wherein said step of generating a single edge vertex set includes:

- recursively examining each vertex in said graph in a manner comprising:
  - identifying said single edge vertex in said graph;
  - adding said single edge vertex to said single edge vertex set; and
  - pruning said single edge vertex from said graph.

17. A method according to claim 15 wherein said step of generating a direct relation edge set includes:

- recursively examining each vertex in said graph in a manner comprising:
  - identifying said single edge vertex in said graph;
  - adding said direct relation edge corresponding to said single edge vertex to said direct relation edge set; and
  - pruning said direct relation edge from said graph.

18. A method according to claim 15 wherein said step of generating a minimal path edge set includes:

- recursively examining said single edge vertex set in a manner comprising: identifying a single edge vertex in said single edge vertex set wherein said single edge vertex is also a field set vertex;
- adding said direct relation edge to said minimal path edge set for said direct relation edge corresponding to said single edge vertex; and
- replacing said single edge vertex in said single edge vertex set with a replacement vertex wherein said single edge vertex is on an originating end of said direct relation edge and said replacement vertex is on a terminating end of said direct relation edge; and
- adding at least one additional direct relation edge to said minimal path edge set for a minimal path between a first field set vertex and second field set vertex in a region of said graph that is identified as a cyclic graph.

19. A method according to claim 18 wherein said step of adding at least one additional direct relation edge includes:

- defining a component for each said field set vertex in said cyclic graph; and
- recursively consolidating each said non-component vertex with one of said components until only one component remains in said cyclic graph, wherein said recursively consolidating comprises:
  - assigning a weighted score to each non-component vertex in said cyclic graph wherein said weighted score is based on an average proximity of each said non-component vertex to each component;
  - consolidating a highest scoring non-component vertex into a nearest component; and
  - adding a direct relation edge from between said highest scoring non-component vertex and said nearest component to said minimal path edge set.

20. A method according to claim 19 wherein said step of consolidating includes:

resolving a tie in a weighted scoring by random selection.

21. A method according to claim 19 wherein said step of consolidating includes:

resolving a tie in a weighted scoring by user intervention.

22. A method according to claim 13 including:

- generating a graph of a sub-schema of said database wherein said sub-schema is defined by said plurality of field set record sources; and
- generating a minimal set of said plurality of relationships.

23. A program storage device readable by a computer, tangibly embodying instructions executable by said computer to perform method steps for automatically generating a structured query language query to extract data from a database, wherein said database includes a schema defined by a plurality of record sources and a plurality of relationships therebetween, said method comprising:

- selecting a field set containing at least one field from among said plurality record sources in said database;
- determining a minimal path relationship between each of a plurality of field set record sources in said database wherein each of said plurality of field set record sources contains at least one field from said field set and wherein said minimal path relationship includes at least one indirect relationship between any two of said plurality of field set record sources, in a manner comprising:
  - generating a graph of said database, wherein said graph includes a vertex for each record source therein and an edge for each relationship between two record sources and wherein each said relationship between two record sources can include a pseudo-relation between a first vertex representing a query-type record source and a second vertex representing another record source;

generating a single edge vertex set that includes each single edge vertex in said graph that is connected to said graph by only one edge;

generating a direct relation edge set that identifies each direct relation for each said single edge vertex in said graph; and generating a minimal path edge set that identifies each direct relation between a first field set vertex and a second field set vertex and any intervening non-field set vertex therebetween in said graph, wherein said field set vertex is a vertex in said graph that represents a record source containing at least one field from said field set, and wherein said minimal path edge set is derived from said direct relation edge set;

generating a graph of a sub-schema of said database wherein said sub-schema is defined by said plurality of field set record sources;

generating a minimal set of said plurality of relationships;

generating said structured query language query defined by said field set record sources and said minimal set of said plurality of relationships; and outputting said structured query language query.

* * * * *

UNITED STATES PATENT AND TRADEMARK OFFICE
CERTIFICATE OF CORRECTION

PATENT NO. : 5,701,460

DATED : December 23, 1997

INVENTOR(S) : David L. Kaplan; Andrew R. Miller

It is certified that error appears in the above-identified patent and that said Letters Patent is hereby corrected as shown below:

Column 12, Line 16, replace "Carp" with --Karp--

Column 12, Line 20, replace "Carp" with --Karp--

Column 12, Line 21, replace "CarpOptionalVertex()" with --Karp Optional Vertex ()--

Column 12, Line 46, replace "Carp" with --Karp--

Column 12, Line 51, replace "Carp" with --Karp--

Signed and Sealed this

Fifth Day of May, 1998

Attest:

BRUCE LEHMAN

Attesting Officer     Commissioner of Patents and Trademarks